(12) United States Patent
Jot et al.

(10) Patent No.: US 12,185,083 B2
(45) Date of Patent: *Dec. 31, 2024

(54) IMMERSIVE AUDIO PLATFORM

(71) Applicant: Magic Leap, Inc., Plantation, FL (US)

(72) Inventors: Jean-Marc Jot, Aptos, CA (US); Michael Minnick, Fort Lauderdale, FL (US); Dmitry Pastouchenko, Folsom, CA (US); Michael Aaron Simon, Fort Lauderdale, FL (US); John Emmitt Scott, III, Plantation, FL (US); Richard St. Clair Bailey, Plantation, FL (US); Shivakumar Balasubramanyam, San Diego, CA (US); Harsharaj Agadi, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,216

(22) Filed: Sep. 20, 2023

(65) Prior Publication Data
US 2024/0015465 A1 Jan. 11, 2024

Related U.S. Application Data

(63) Continuation of application No. 18/146,284, filed on Dec. 23, 2022, now Pat. No. 11,800,313, which is a
(Continued)

(51) Int. Cl.
H04S 7/00 (2006.01)
G02B 27/00 (2006.01)
(Continued)

(52) U.S. Cl.
CPC ............ H04S 7/304 (2013.01); G02B 27/017 (2013.01); H04S 2400/01 (2013.01); H04S 2400/11 (2013.01); H04S 2420/01 (2013.01)

(58) Field of Classification Search
None
See application file for complete search history.

(56) References Cited

U.S. PATENT DOCUMENTS

| 4,852,988 A | 8/1989 | Velez |
| 6,433,760 B1 | 8/2002 | Vaissie |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Chinese Notice of Allowance dated Oct. 25, 2023, for CN Application No. 202180032102.X, with English translation, 4 pages.
(Continued)

Primary Examiner — Qin Zhu
(74) Attorney, Agent, or Firm — Morrison & Foerster LLP

(57) ABSTRACT

Disclosed herein are systems and methods for presenting audio content in mixed reality environments. A method may include receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of a wearable head device; receiving, via the second service, a third input from the application program, wherein the third input corresponds to a position of one or more virtual speakers; generating, via the second service, a spatialized audio stream based on the decoded audio stream, the second
(Continued)

input, and the third input; presenting, via one or more speakers of the wearable head device, the spatialized audio stream.

20 Claims, 11 Drawing Sheets

Related U.S. Application Data continuation of application No. 17/190,326, filed on Mar. 2, 2021, now Pat. No. 11,627,428.

(60) Provisional application No. 63/036,270, filed on Jun. 8, 2020, provisional application No. 62/984,198, filed on Mar. 2, 2020.

(51) Int. Cl.
  *G02B 27/01* (2006.01)
  *H04R 1/02* (2006.01)
  *H04S 3/00* (2006.01)

(56) References Cited

U.S. PATENT DOCUMENTS

| | | |
|---|---|---|
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,347,551 B2 | 3/2008 | Fergason et al. |
| 7,488,294 B2 | 2/2009 | Torch |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-z eev et al. |
| 9,323,325 B2 | 4/2016 | Perez et al. |
| 9,720,505 B2 | 8/2017 | Gribetz et al. |
| 10,013,053 B2 | 7/2018 | Cederlund et al. |
| 10,025,379 B2 | 7/2018 | Drake et al. |
| 10,165,354 B1 | 12/2018 | Toda et al. |
| 11,212,606 B1 | 12/2021 | Oishi |
| 11,627,428 B2 | 4/2023 | Jot et al. |
| 11,800,313 B2 | 10/2023 | Jot et al. |
| 2003/0030597 A1 | 2/2003 | Geist |
| 2006/0023158 A1 | 2/2006 | Howell et al. |
| 2011/0182431 A1 | 7/2011 | Pang et al. |
| 2011/0211056 A1 | 9/2011 | Publicover et al. |
| 2011/0213664 A1 | 9/2011 | Osterhout |
| 2011/0299707 A1 | 12/2011 | Meyer |
| 2012/0020502 A1 | 1/2012 | Adams |
| 2012/0021806 A1 | 1/2012 | Maltz |
| 2013/0077147 A1 | 3/2013 | Efimov |
| 2014/0140516 A1 | 5/2014 | Taleb et al. |
| 2014/0195918 A1 | 7/2014 | Friedlander |
| 2014/0300636 A1 | 10/2014 | Miyazaya et al. |
| 2015/0168731 A1 | 6/2015 | Robbins |
| 2016/0266865 A1 | 9/2016 | Tsingos et al. |
| 2017/0257724 A1 | 9/2017 | Bosnjak et al. |
| 2018/0091922 A1 | 3/2018 | Satongar et al. |
| 2018/0284882 A1 | 10/2018 | Shipes et al. |
| 2021/0037336 A1 | 2/2021 | Eronen et al. |
| 2021/0289309 A1 | 9/2021 | Herre et al. |

FOREIGN PATENT DOCUMENTS

| | | |
|---|---|---|
| CA | 2388766 A1 | 12/2003 |
| WO | 2021178454 A1 | 9/2021 |

OTHER PUBLICATIONS

European Search Report dated Feb. 6, 2024, for EP Application No. 21763590.3, nine pages.
Final Office Action mailed Sep. 23, 2022, for U.S. Appl. No. 17/190,326, filed Mar. 2, 2021, 13 pages.
International Preliminary Report on Patentability and Written Opinion mailed Sep. 15, 2022, for PCT Application No. PCT/US2021/20547, filed Mar. 2, 2021, 13 pages.
International Search Report and Written Opinion mailed Jun. 15, 2021, for PCT Application No. PCT/US2021/20547, filed Mar. 2, 2021, nineteen pages.
Jacob, R. "Eye Tracking in Advanced Interface Design", Virtual Environments and Advanced Interface Design, Oxford University Press, Inc. (Jun. 1995).
Non-Final Office Action mailed Jun. 20, 2023, for U.S. Appl. No. 18/146,284, filed Dec. 23, 2022, seven pages.
Non-Final Office Action mailed May 16, 2022, for U.S. Appl. No. 17/190,326, filed Mar. 2, 2021, ten pages.
Notice of Allowance mailed Aug. 22, 2023, for U.S. Appl. No. 18/146,284, filed Dec. 23, 2022, five pages.
Notice of Allowance mailed Nov. 28, 2022, for U.S. Appl. No. 17/190,326, filed Mar. 2, 2021, 8 pages.
Rolland, J. et al., "High-resolution inset head-mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Japanese Office Action mailed May 29, 2024, for JP Patent Application 2022-552758, with English translation, 6 pages.

IMMERSIVE AUDIO PLATFORM

CROSS-REFERENCE TO RELATED APPLICATIONS

This application is a Continuation of U.S. Non-Provisional application Ser. No. 18/146,284, filed Dec. 23, 2022, which is a Continuation of U.S. Non-Provisional application Ser. No. 17/190,326, filed Mar. 2, 2021, now U.S. Pat. No. 11,627,428, which claims benefit of U.S. Provisional Application No. 62/984,198, filed Mar. 2, 2020, and U.S. Provisional Application No. 63/036,270, filed Jun. 8, 2020, the contents of which are incorporated herein by reference in their entirety.

FIELD

This disclosure relates in general to systems and methods for presenting immersive audio content, and in particular to systems and methods for presenting immersive audio content in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of a XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of a XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of a XR system in a large concert hall will expect the virtual sounds of the XR system to have large, cavernous sonic qualities; conversely, a user in a small apartment will expect the sounds to be more dampened, close, and immediate. In addition to matching virtual sounds with acoustic properties of a real and/or virtual environment, realism is further enhanced by spatializing virtual sounds. For example, a virtual object may visually fly past a user from behind, and the user may expect the corresponding virtual sound to similarly reflect the spatial movement of the virtual object with respect to the user.

Existing technologies often fall short of these expectations, such as by presenting virtual audio that does not take into account a user's surroundings or does not correspond to spatial movements of a virtual object, leading to feelings of inauthenticity that can compromise the user experience. Observations of users of XR systems indicate that while users may be relatively forgiving of visual mismatches between virtual content and a real environment (e.g., inconsistencies in lighting); users may be more sensitive to auditory mismatches. Our own auditory experiences, refined continuously throughout our lives, can make us acutely aware of how our physical environments affect the sounds we hear; and we can be hyper-aware of sounds that are inconsistent with those expectations. With XR systems, such inconsistencies can be jarring, and can turn an immersive and compelling experience into a gimmicky, imitative one. In extreme examples, auditory inconsistencies can cause motion sickness and other ill effects as the inner ear is unable to reconcile auditory stimuli with their corresponding visual cues.

Using sensors, transmissive displays, and speakers, XR systems may present immersive visuals and audio content to users. Such capabilities may lend themselves well to entertainment aspects. For example, a XR movie may include virtual content displayed in three dimensions around a user's environment. A XR movie may also include audio content, which may be configured to be played in a multi-channel speaker array. It can be desirable to develop systems and methods that may facilitate easy playback of audio content that may be more complex than simple stereo sound. In some cases, audio content may be high fidelity, which may increase an amount of data to process in the playback of audio content. Large amounts of data may be compressed and/or encoded to minimize bandwidth and/or processing requirements. It can therefore be desirable to develop systems and methods that can playback compressed audio content.

BRIEF SUMMARY

Examples of the disclosure describe systems and methods for presenting audio content in mixed reality environments. According to examples of the disclosure, a method may include receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of a wearable head device; receiving, via the second service, a third input from the application program, wherein the third input corresponds to a position of one or more virtual speakers; generating, via the second service, a spatialized audio stream based on the decoded audio stream, the second input, and the third input; presenting, via one or more speakers of the wearable head device, the spatialized audio stream.

In some embodiments, a method comprises: receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of a wearable head device; receiving, via the second service, a third input from the application program, wherein the third input corresponds to a position of one or more virtual speakers; generating, via the second service, a spatialized audio stream based on the decoded audio stream, the second input, and the third input; and presenting, via one or more speakers of the wearable head device, the spatialized audio stream.

In some embodiments, the second input corresponds to a position of the wearable head device.

In some embodiments, the position of the one or more virtual speakers is based on the position of the wearable head device.

In some embodiments, the second input corresponds to a position of a physical object in a real environment.

In some embodiments, the position of the one or more virtual speakers is based on the position of the physical object.

In some embodiments, the encoded audio stream is received from a remote server.

In some embodiments, the first service is a different service than the second service.

In some embodiments, the spatialized audio stream comprises six audio channels, wherein one of the six audio channels comprises a subwoofer channel.

In some embodiments, the spatialized audio stream comprises eight audio channels, wherein one of the eight audio channels comprises a subwoofer channel.

In some embodiments, presenting the spatialized audio stream is based on a position and distance of the wearable head device relative to a virtual screen configured to present a virtual content displayed on a display of the wearable head device.

In some embodiments, the spatialized audio stream is presented based on at least one of user spatialized audio, per-screen spatialized audio, and per-room spatialized audio.

In some embodiments, the spatialized audio stream is presented based on the per-screen spatialized audio, the spatialized audio stream is associated with one of a static mode and a dynamic mode, and the wearable head device is in a first position. The method further comprises: moving the wearable head device from the first position to a second position, different from the first position; in accordance with a determination that the spatialized audio stream is associated with the static mode, presenting the first spatialized audio based on a first distance from the first position to at least one of the position of one or more virtual speakers; and in accordance with a determination that the spatialized audio stream is associated with the dynamic mode, presenting a second spatialized audio based on a second distance from the second position to at least one of the position of one or more virtual speakers.

In some embodiments, the spatialized audio stream is presented based on the per-room spatialized audio. The method further comprises: in accordance with a determination that a position of the wearable head device is in a first room, presenting the spatialized audio comprises presenting a first spatialized audio associated with the first room; and in accordance with a determination that a position of the wearable head device is in a second room, presenting the spatialized audio comprises presenting a second spatialized audio associated with the second room. The first spatialized audio is different than the second spatialized audio, and the first room is different than the second room.

In some embodiments, the presentation of the spatialized audio stream is based on user settings.

In some embodiments, the presentation of the spatialized audio stream is based on settings of the application program.

In some embodiments, the first spatialized audio stream is associated with a centralized setting. The method further comprises: receiving a fourth input from a second application program; and presenting, via the one or more speakers of the wearable head device, a second spatialized audio stream associated with the centralized setting.

In some embodiments, a system comprises: a wearable head device comprising one or more sensors and one or more speakers; and one or more processors configured to execute a method comprising: receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of the wearable head device; receiving, via the second service, a third input from the application program, wherein the third input corresponds to a position of one or more virtual speakers; generating, via the second service, a spatialized audio stream based on the decoded audio stream, the second input, and the third input; and presenting, via the one or more speakers of the wearable head device, the spatialized audio stream.

In some embodiments, the second input corresponds to a position of the wearable head device.

In some embodiments, the position of the one or more virtual speakers is based on the position of the wearable head device.

In some embodiments, the second input corresponds to a position of a physical object in a real environment.

In some embodiments, the position of the one or more virtual speakers is based on the position of the physical object.

In some embodiments, the encoded audio stream is received from a remote server.

In some embodiments, the first service is a different service than the second service.

In some embodiments, the spatialized audio stream comprises six audio channels, wherein one of the six audio channels comprises a subwoofer channel.

In some embodiments, the spatialized audio stream comprises eight audio channels, wherein one of the eight audio channels comprises a subwoofer channel.

In some embodiments, presenting the spatialized audio stream is based on a position and distance of the wearable head device relative to a virtual screen configured to present a virtual content displayed on a display of the wearable head device.

In some embodiments, the spatialized audio stream is presented based on at least one of user spatialized audio, per-screen spatialized audio, and per-room spatialized audio.

In some embodiments, the spatialized audio stream is presented based on the per-screen spatialized audio, the spatialized audio stream is associated with one of a static mode and a dynamic mode, the wearable head device is in a first position, and the method further comprises: moving the wearable head device from the first position to a second position, different from the first position; in accordance with a determination that the spatialized audio stream is associated with the static mode, presenting the first spatialized audio based on a first distance from the first position to at least one of the position of one or more virtual speakers; and in accordance with a determination that the spatialized audio stream is associated with the dynamic mode, presenting a second spatialized audio based on a second distance from the second position to at least one of the position of one or more virtual speakers.

In some embodiments, the spatialized audio stream is presented based on the per-room spatialized audio, and the method further comprises: in accordance with a determination that a position of the wearable head device is in a first room, presenting the spatialized audio comprises presenting a first spatialized audio associated with the first room; and in accordance with a determination that a position of the wearable head device is in a second room, presenting the spatialized audio comprises presenting a second spatialized audio associated with the second room. The first spatialized audio is different than the second spatialized audio, and the first room is different than the second room.

In some embodiments, the presentation of the spatialized audio stream is based on user settings.

In some embodiments, the presentation of the spatialized audio stream is based on settings of the application program.

In some embodiments, the first spatialized audio stream is associated with a centralized setting, and the method further comprises: receiving a fourth input from a second application program; and presenting, via the one or more speakers of the wearable head device, a second spatialized audio stream associated with the centralized setting.

In some embodiments, a non-transitory computer-readable medium storing instructions, when executed by one or more processors, cause the one or more processors to execute a method comprising: receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of a wearable head device; receiving, via the second service, a third input from the application program, wherein the third input corresponds to a position of one or more virtual speakers; generating, via the second service, a spatialized audio stream based on the decoded audio stream, the second input, and the third input; and presenting, via one or more speakers of the wearable head device, the spatialized audio stream.

In some embodiments, the second input corresponds to a position of the wearable head device.

In some embodiments, the position of the one or more virtual speakers is based on the position of the wearable head device.

In some embodiments, the second input corresponds to a position of a physical object in a real environment.

In some embodiments, the position of the one or more virtual speakers is based on the position of the physical object.

In some embodiments, the encoded audio stream is received from a remote server.

In some embodiments, the first service is a different service than the second service.

In some embodiments, the spatialized audio stream comprises six audio channels, wherein one of the six audio channels comprises a subwoofer channel.

In some embodiments, the spatialized audio stream comprises eight audio channels, wherein one of the eight audio channels comprises a subwoofer channel.

In some embodiments, presenting the spatialized audio stream is based on a position and distance of the wearable head device relative to a virtual screen configured to present a virtual content displayed on a display of the wearable head device.

In some embodiments, the spatialized audio stream is presented based on at least one of user spatialized audio, per-screen spatialized audio, and per-room spatialized audio.

In some embodiments, the spatialized audio stream is presented based on the per-screen spatialized audio, the spatialized audio stream is associated with one of a static mode and a dynamic mode, the wearable head device is in a first position, and the method further comprises: moving the wearable head device from the first position to a second position, different from the first position; in accordance with a determination that the spatialized audio stream is associated with the static mode, presenting the first spatialized audio based on a first distance from the first position to at least one of the position of one or more virtual speakers; and in accordance with a determination that the spatialized audio stream is associated with the dynamic mode, presenting a second spatialized audio based on a second distance from the second position to at least one of the position of one or more virtual speakers.

In some embodiments, the spatialized audio stream is presented based on the per-room spatialized audio, and the method further comprises: in accordance with a determination that a position of the wearable head device is in a first room, presenting the spatialized audio comprises presenting a first spatialized audio associated with the first room; and in accordance with a determination that a position of the wearable head device is in a second room, presenting the spatialized audio comprises presenting a second spatialized audio associated with the second room. The first spatialized audio is different than the second spatialized audio, and the first room is different than the second room.

In some embodiments, the presentation of the spatialized audio stream is based on user settings.

In some embodiments, the presentation of the spatialized audio stream is based on settings of the application program.

In some embodiments, the first spatialized audio stream is associated with a centralized setting, and the method further comprises: receiving a fourth input from a second application program; and presenting, via the one or more speakers of the wearable head device, a second spatialized audio stream associated with the centralized setting.

DETAILED DESCRIPTION

Figure 1A:
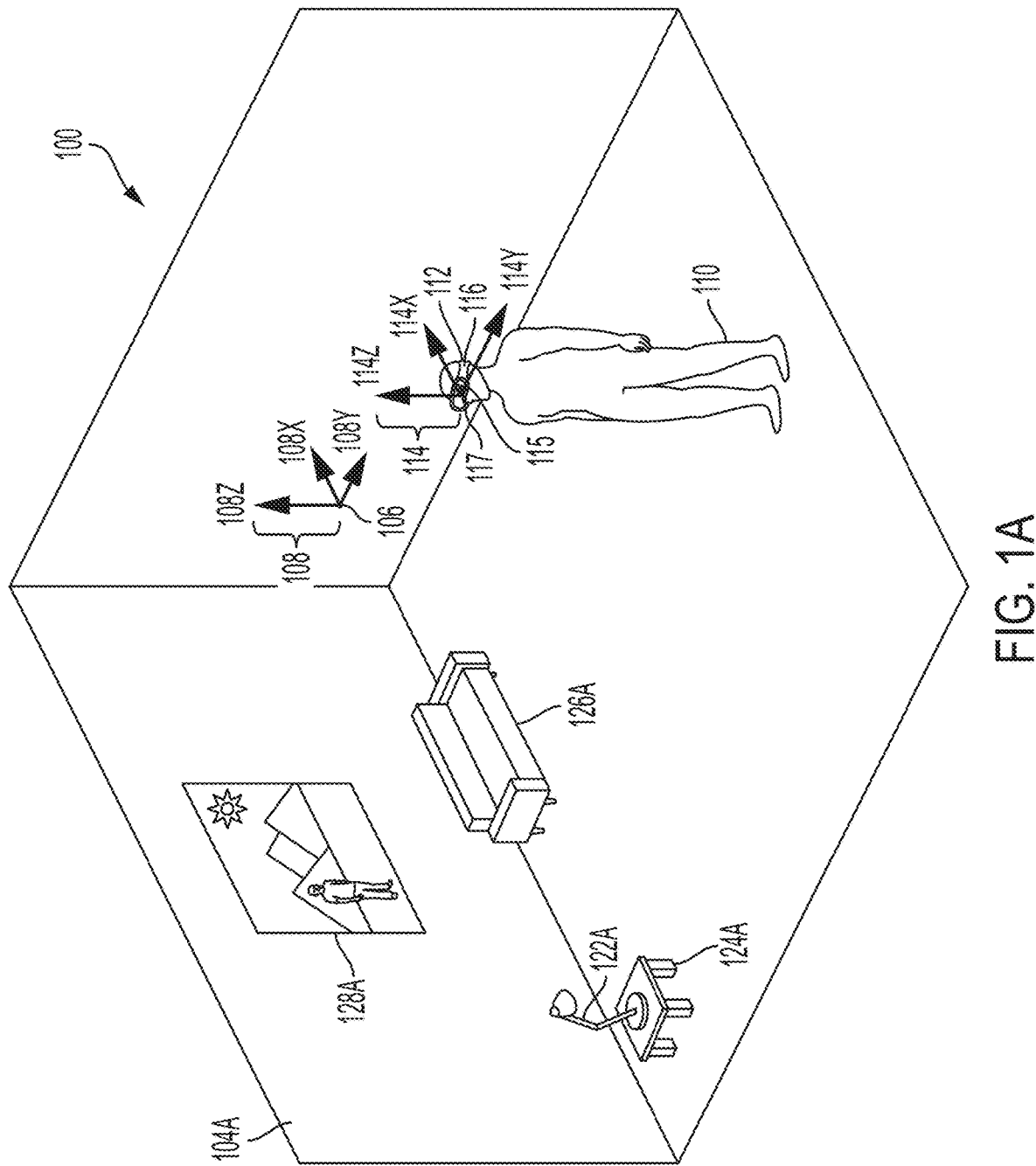
FIGS. 1A-1C illustrate an example mixed reality environment, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, an MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In an MRE, a virtual object (e.g., in a virtual environment associated with the MRE) can correspond to a real object (e.g., in a real environment associated with the MRE). For instance, if the real environment of an MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MRE, not all real objects in a real environment may be associated with a corresponding virtual object. Likewise, in some examples of an MRE, not all virtual objects in a virtual environment may be associated with a corresponding real object. That is, some virtual objects may solely in a virtual environment of an MRE, without any real-world counterpart.

In some examples, virtual objects may have characteristics that differ, sometimes drastically, from those of corresponding real objects. For instance, while a real environment in an MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may include a display (e.g., a transmissive display) and one or more speakers, and one or more sensors (e.g., a camera), for example as described below. The real environment 100 shown includes a rectangular room 104A, in which user 110 is standing; and real objects 122A (a lamp), 124A (a table), 126A (a sofa), and 128A (a painting). Room 104A further includes a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation.

In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
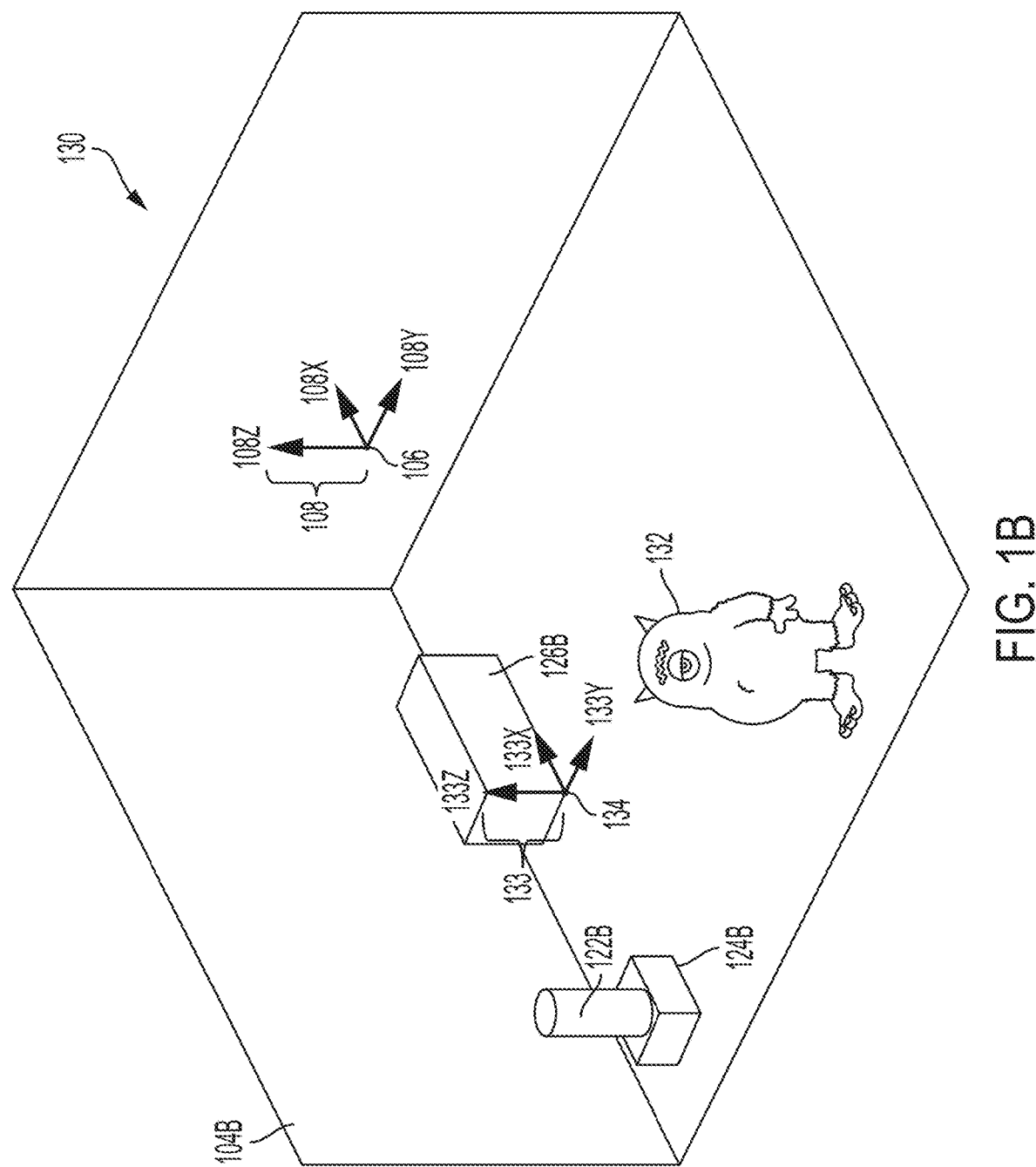

FIG. 1B illustrates an example virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
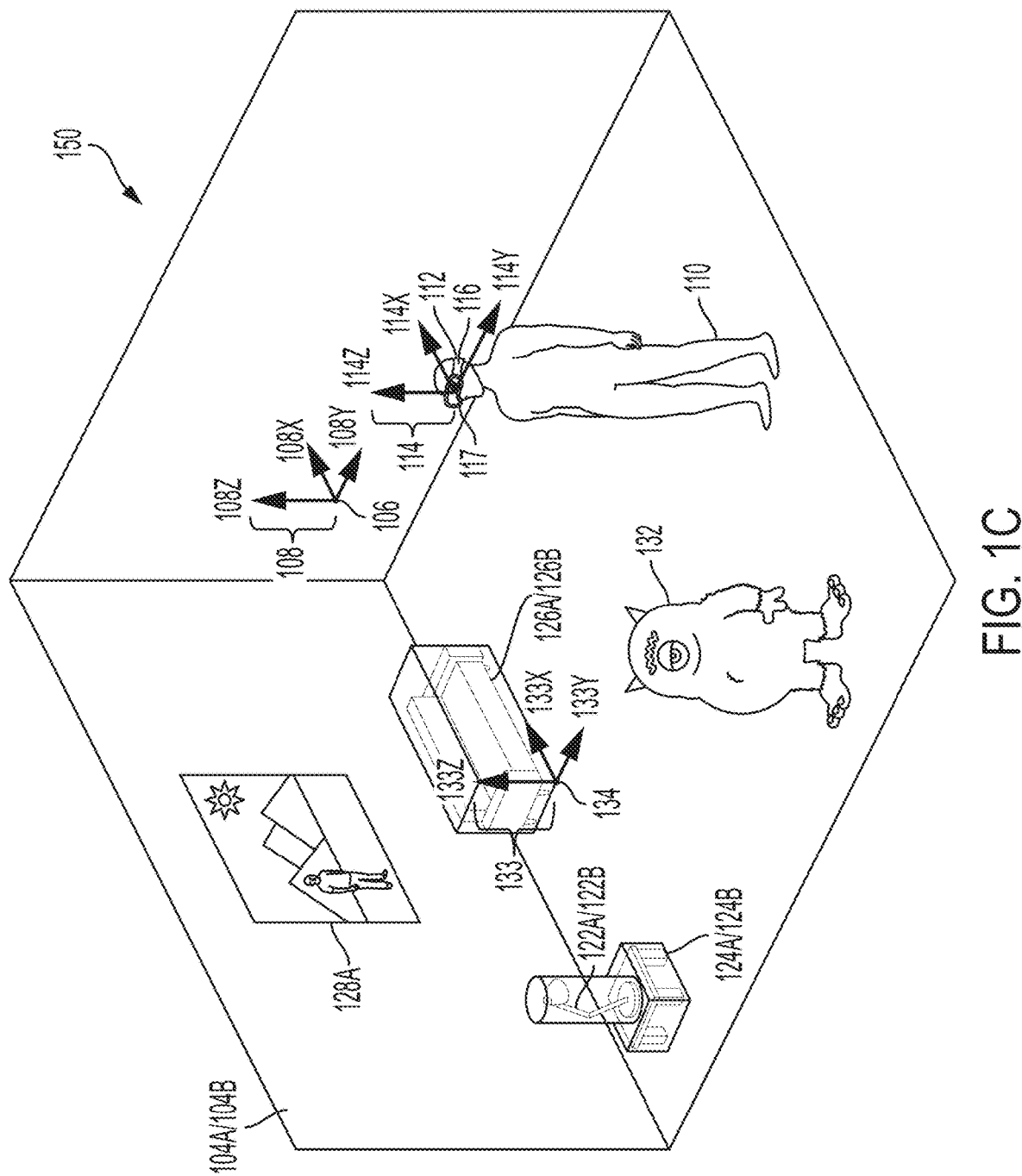

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
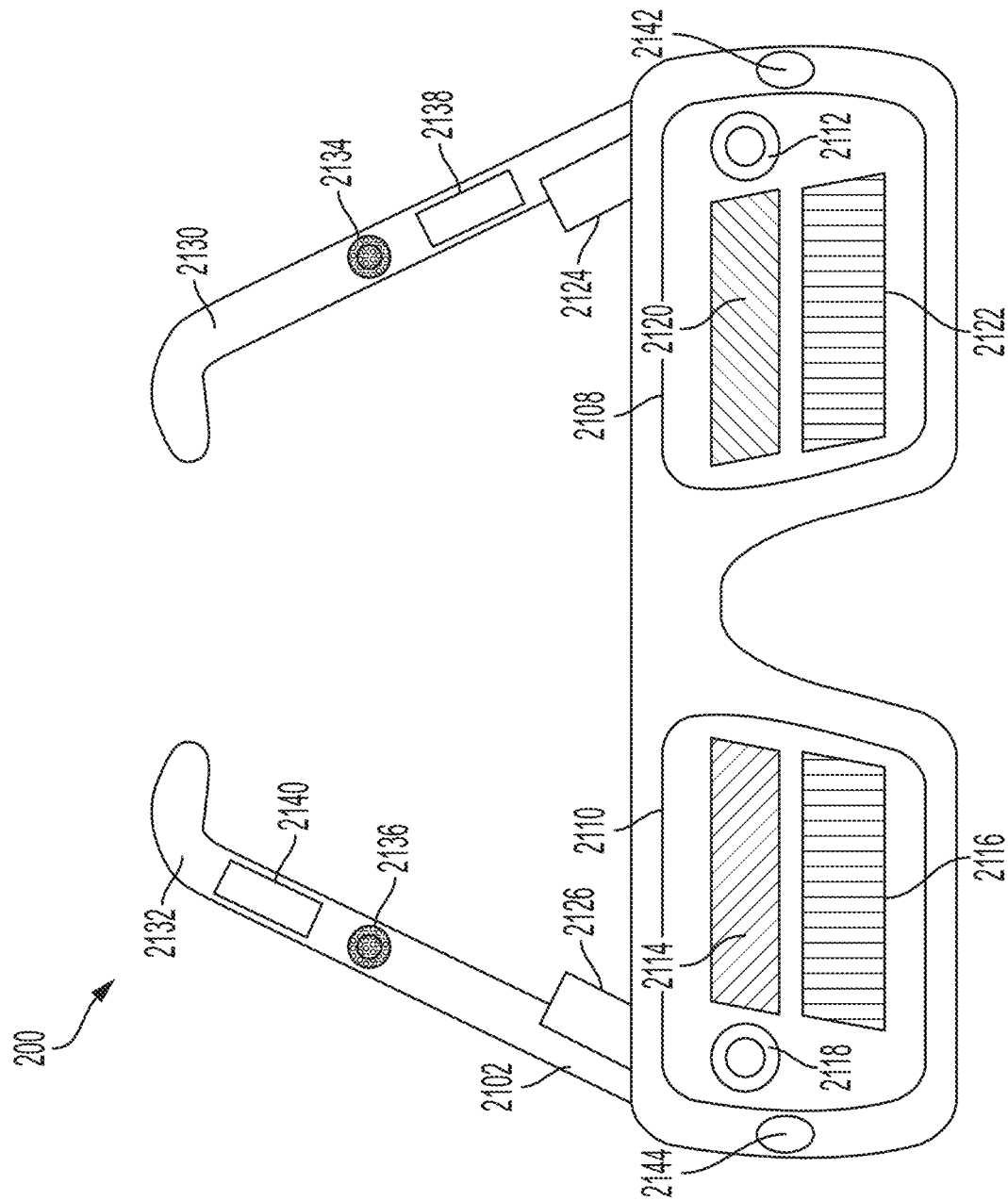
FIGS. 2A-2D illustrate components of an example mixed reality system that can be used to generate and interact with a mixed reality environment, according to some embodiments.
Figure 2B:
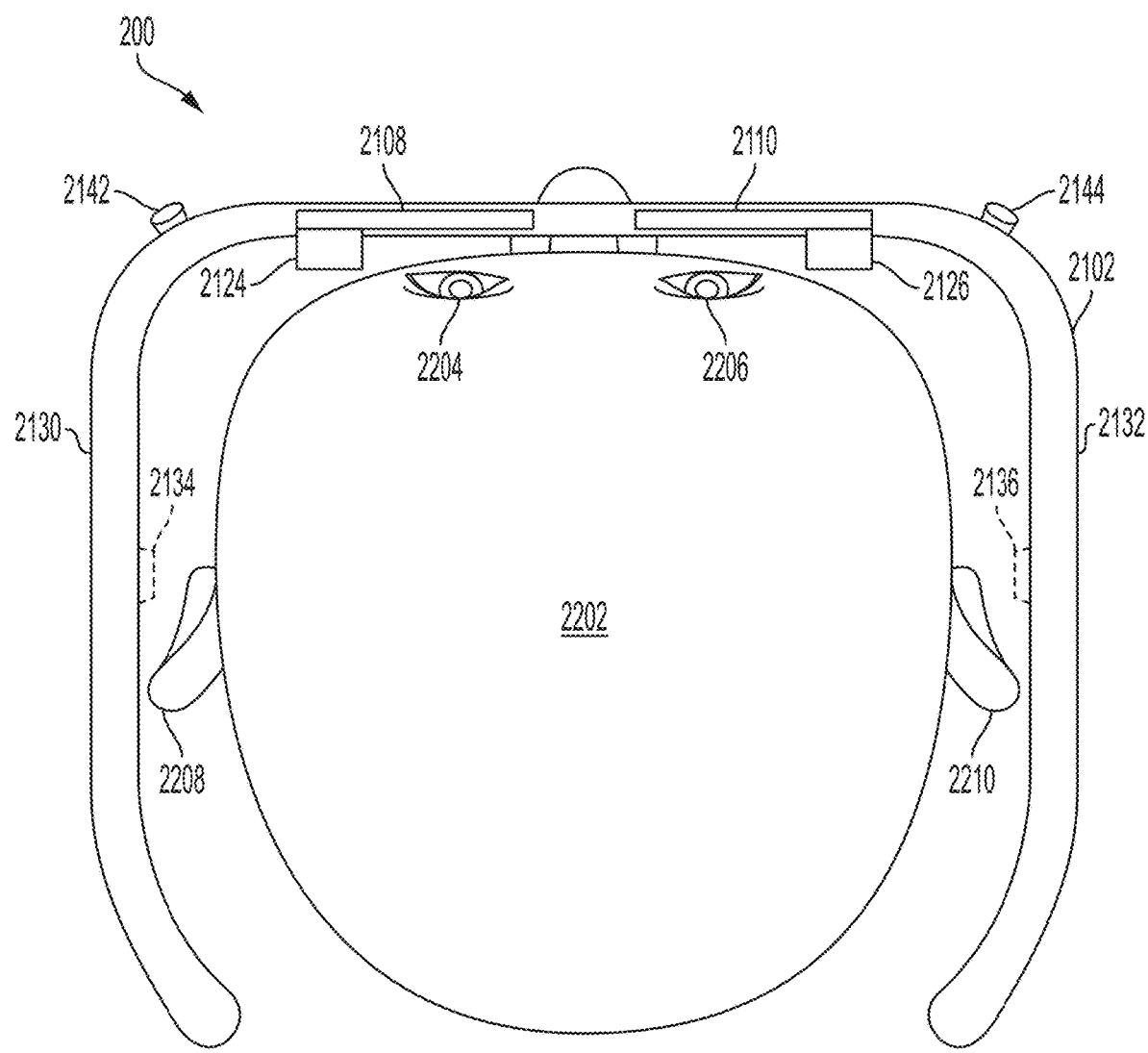
Figure 2C:
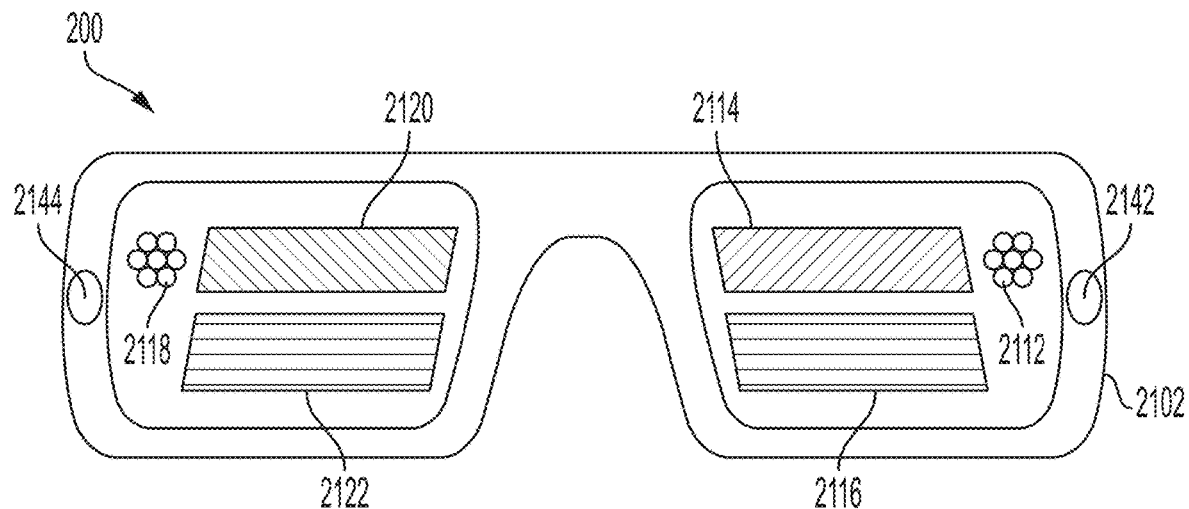
Figure 2D:
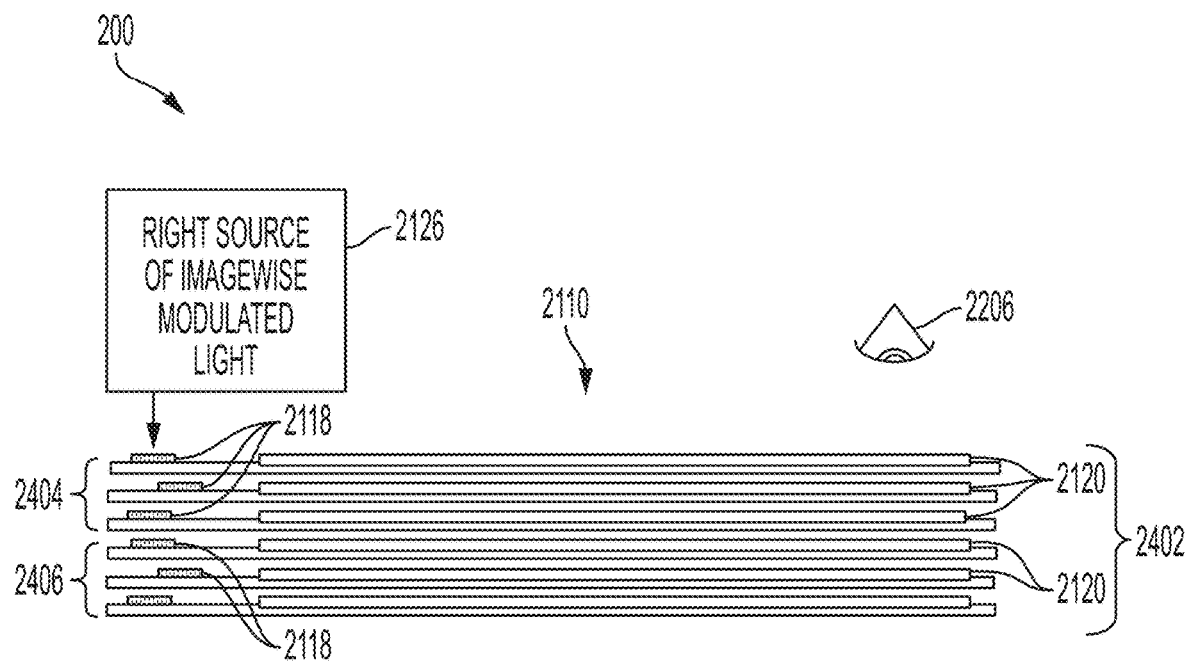

FIGS. 2A-2D illustrate components of an example mixed reality system 200 (which may correspond to mixed reality system 112) that may be used to present an MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (ILED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
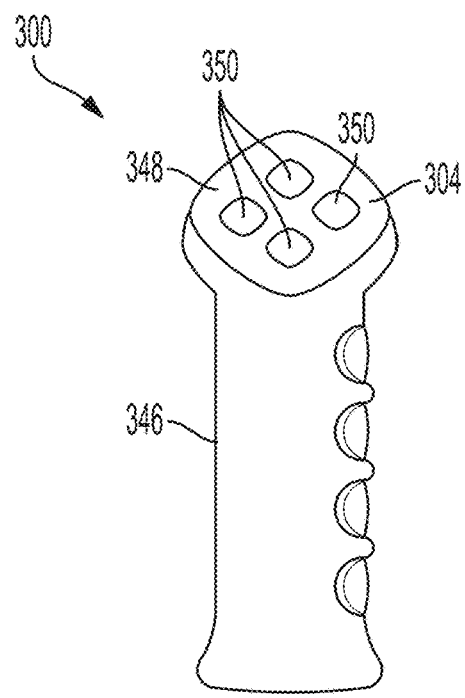
FIG. 3A illustrates an example mixed reality handheld controller that can be used to provide input to a mixed reality environment, according to some embodiments.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
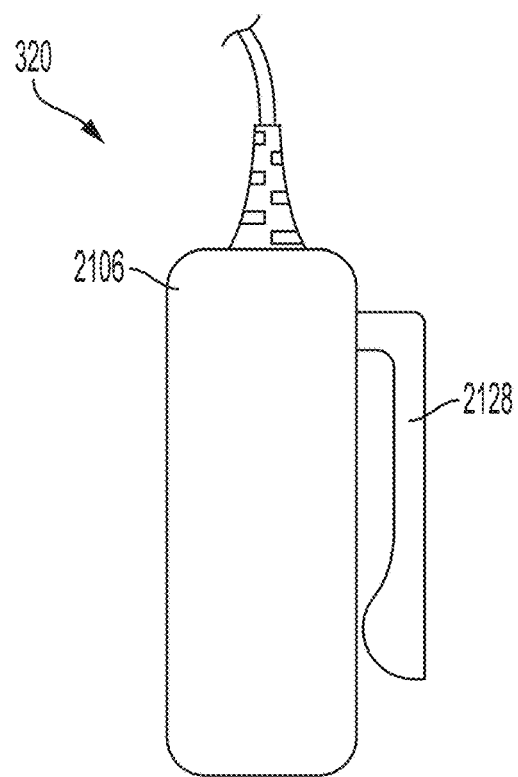
FIG. 3B illustrates an example auxiliary unit that can be used with an example mixed reality system, according to some embodiments.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
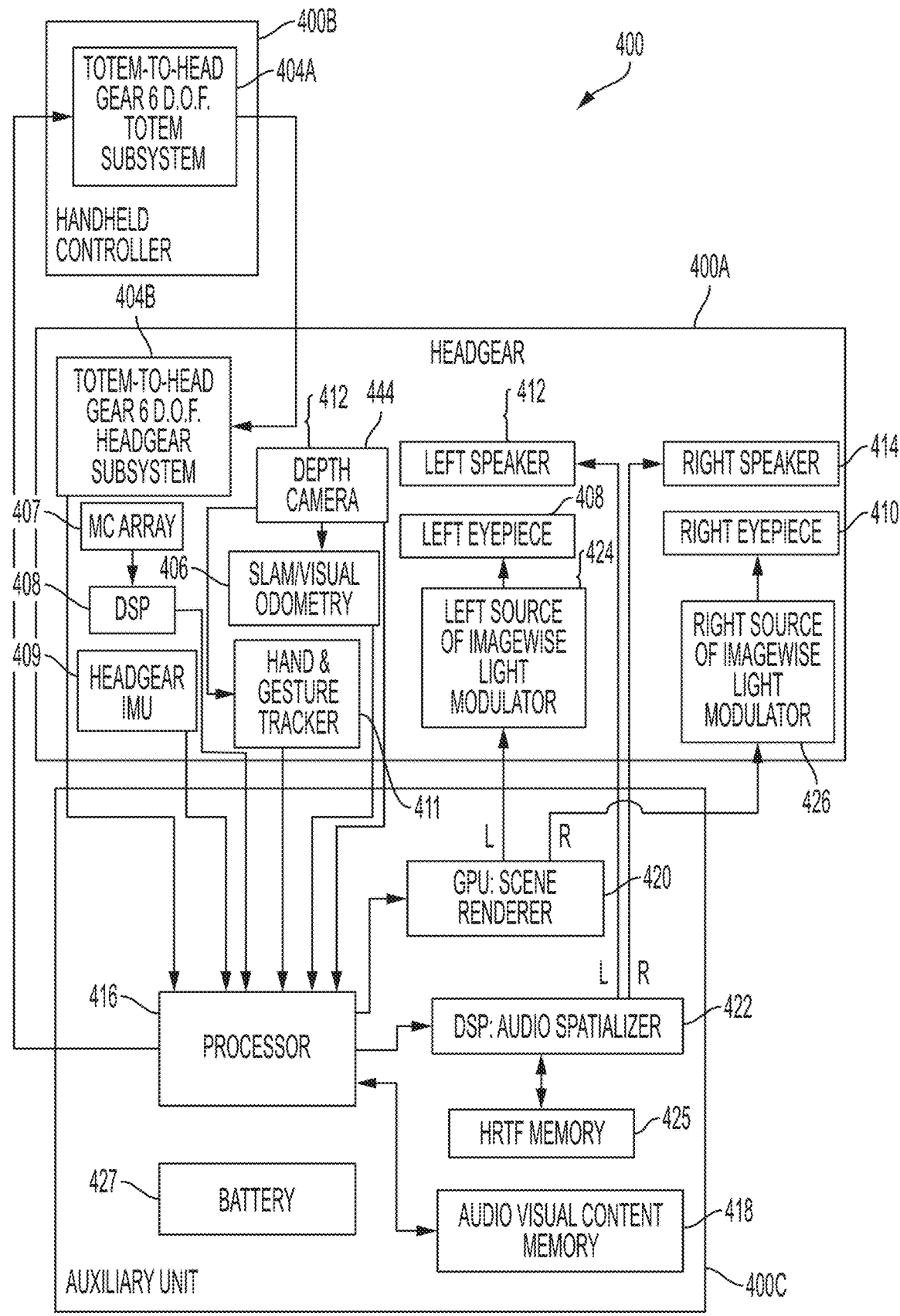
FIG. 4 illustrates an example functional block diagram for an example mixed reality system, according to some embodiments.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Immersive Audio Platform

XR systems may leverage unique capabilities to display virtual content in a user's real environment for immersive applications. For example, a single XR system may approach, match, or even exceed an experience provided by a large television screen and an expensive multi-channel loudspeaker setup. A XR system may display a virtual screen to a user, and the virtual screen can be made as large or as small as a user desires. Utilizing virtual object persistence relative to a real environment, a XR system may even present the virtual screen at a fixed location on an empty wall across from a sofa, which may functionally simulate a physical installed television. A user may sit on the sofa and consume entertainment on a 50" screen, a 100" screen, a 200" screen, or any size screen the user desires.

As part of visual displays, XR systems may benefit from presenting audio to users. For example, many movies that can be purchased and/or streamed may include multi-channel, surround-sound audio (tracks). Such audio tracks may be configured to be played on stereo channel speakers, 5.1 channel speakers, 7.1 channel speakers, or any other configuration of speakers. Similar to a virtual screen, XR systems may leverage computational engineering to present users with a simulated experience/speaker setup that can approach, match, or even exceed an experience provided by a physical experience/speaker setup. For example, XR systems may arrange virtual speakers around a user's real environment to simulate a physical 5.1 channel speaker arrangement. If a user wishes to simulate a physical arrangement, the virtual speakers may remain in fixed locations relative to the user's environment (as if they were physically installed). In some embodiments, a user may take advantage of the flexibility of XR systems and rearrange virtual speakers into different locations, add speakers, subtract speakers, have the virtual speakers follow them, etc.

It can therefore be desirable to develop systems and methods to process audio content. In some embodiments, audio content may include multiple sound tracks configured to be played through multiple speaker channels. In some embodiments, audio content can be high fidelity (e.g., a high bitrate), which may increase the amount of data required to store the audio content and/or the amount of processing required to process (e.g., decode, decompress, etc.) the audio content. It can therefore be challenging to deliver and/or store audio content. For example, an online streaming service may be required to transmit large amounts of data to a single user so that the user can enjoy high-definition video and/or high-definition audio. When millions of simultaneous users come into play, it may not be feasible to deliver such data-heavy content at original quality.

In some embodiments, codecs can be used to help efficiently deliver and/or store media (e.g., video and/or audio) content. A codec can include computer instructions that may be configured to encode and/or compress data in a particular way. In some embodiments, uncompressed data can include pulse code modulation ("PCM"), which may digitally represent an analog signal (e.g., through sampling). Compressed data may be significantly smaller in size and require significantly less bandwidth to transmit than original, uncompressed data. In some embodiments, some fidelity may be lost as a result of compression, but such trade-offs may be necessary to feasibly deliver and/or store large amounts of data. In some embodiments, a codec can include computer instructions that may be configured to decode and/or decompress data. In some embodiments, encoded data may not be directly playable on a device, and the encoded media data may be decoded so that the information can be presented in a readable format to a system and/or an application program running on the device. Decoding can include reconstructing the original, uncompressed data based on the encoding standard used to originally encode the data. Examples of audio codecs can include MP3, WMA, WAV, AAC, AC3, FLAC, ALAC, etc.

Because codecs can be widely used and adopted, it can be desirable to develop systems and methods for a XR system (e.g., MR system 112, 200) to provide an audio platform for application programs running on the XR systems. In some embodiments, an audio platform can enable application developers to easily implement audio playback features (e.g., handling encoded audio streams) without significant effort on the part of the developers. In some embodiments, providing a platform-level audio solution can enable consistent playback across multiple applications which may have been developed by multiple developers. A platform-level audio solution can also benefit from connecting with other platform-level features of XR systems, which may allow applications to easily leverage more complex XR functions.

For example, a decoded audio stream may include multiple channels, which may be spatialized. Spatialized audio can include audio that is presented as if it is originating from one or more points in space around a user's real and/or virtual environment. Instead of simple channel audio, spatialized audio can react to a user's positioning in an environment. For example, stereo audio may play sound from a left channel and a right channel at a volume dictated by the audio stream, and the volume may not account for a user's movement. If the user moves to the left, simple stereo audio may not increase a volume played at a left speaker. However, spatialized audio may present a left channel as originating from a point in space to the user's left (as if a physical left channel speaker was installed there). In some embodiments, a user may move towards that point in space, and the spatialized left channel sound may increase in volume according to the diminished distance between the sound source and the user.

An audio platform solution can therefore provide significant benefits to developers and users. Developers may easily access platform functions without having to incorporate significant features in application space. Instead, using abstraction, a developer can leverage platform-level functions using interfaces between an application space and one or more platform services. For example, an application implemented by the developer may control native platform-level functions. Users can benefit from additional developer flexibility, for example, a developer may leverage other platform features like spatialized audio to efficiently and easily deliver immersive audio experiences.

Figure 5:
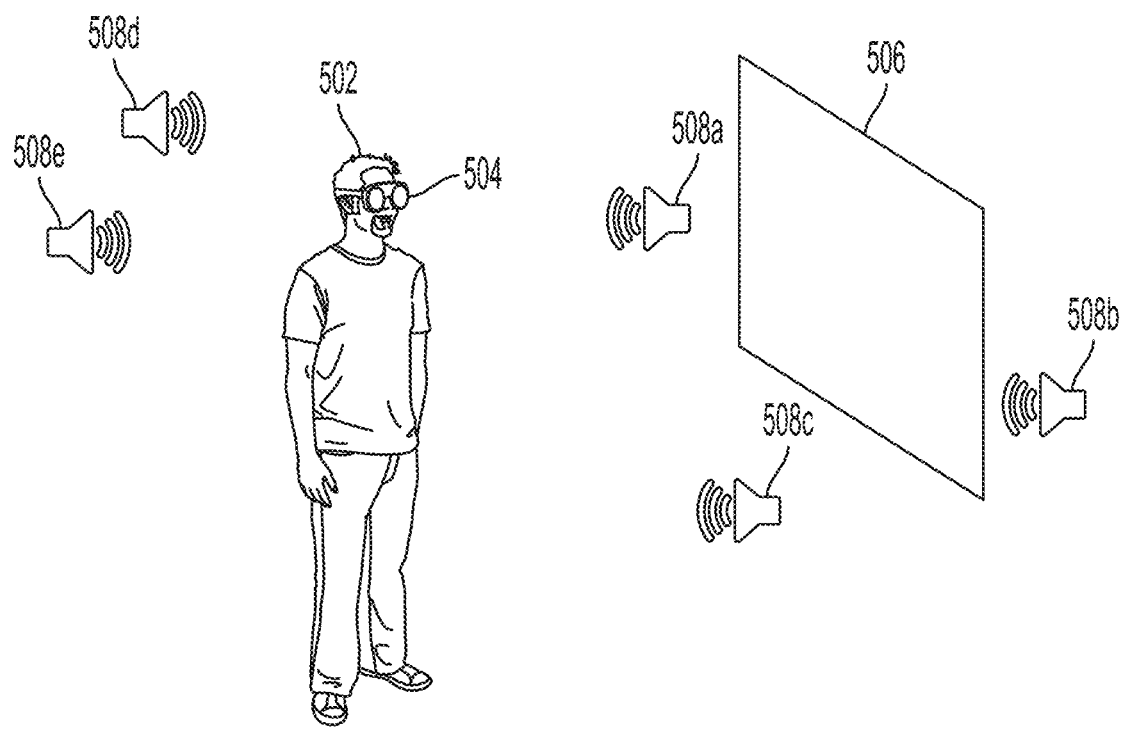
FIG. 5 illustrates an example display of immersive audio content, according to some embodiments.

FIG. 5 illustrates an example display of immersive audio content, according to some embodiments. In some embodiments, user 502 may experience immersive audio content through XR system 504, which can correspond to MR systems 112, 200. In some embodiments, other XR systems (e.g., a VR system) may be used. XR system 504 may be used to present media content that may not have been designed specifically for XR use. For example, a digital movie may have been designed for playback on a two-dimensional screen with a physical speaker arrangement (e.g., five channels and a subwoofer channel). In some embodiments, digital content may be configured in one or more standard configurations that may enable playback across different devices. For example, video and/or audio content may be encoded using codecs that may compress data into a more manageable size to facilitate storage and transmittal. In some embodiments, video and/or audio content may include containers, which may include one or more data structures that relate data stored within the container.

It can be beneficial for XR system 504 to include systems and methods for receiving audio content encoded in standard formats. For example, user 502 may wish to stream a digital movie from one or more remote servers using XR system 504. In some embodiments, one or more remote servers may encode audio content associated with the digital movie and transmit the encoded audio content to XR system 504 (e.g., because audio content may be more efficiently stored and/or transmitted after being encoded). XR system 504 can receive the encoded audio content from the one or more servers. In some embodiments, XR system 504 may decode the received encoded audio content. In some embodiments, decoding audio content can include converting audio content into PCM data. In some embodiments, encoded audio content can include multiple (e.g., six) channels of audio content, which can be configured to be presented at different speaker locations. In FIG. 5, the six channels may assume a configuration in which speakers are placed to the left of a screen, to the right of a screen, below a screen, at a user's back-left side, and at a user's back-right side, and a subwoofer (not shown) may be placed, for instance, near the screen or near the user.

In some embodiments, XR system 504 may parse audio content to determine how it should present the audio content to user 502. For example, the audio content received by XR system 504 may include metadata indicating a speaker arrangement. In some embodiments, XR system 504 can decode audio content and spatialize audio content to simulate a speaker arrangement. For example, XR system 504 may render six audio channels for playback, which may include spatializing one or more audio channels. In some embodiments, a front-left audio channel may be spatialized to speaker position 508a, which may be to the left of virtual screen 506. In some embodiments, a front-right audio channel can be spatialized to speaker position 508b, which may be to the right of virtual screen 506. In some embodiments, a center channel can be spatialized to speaker position 508c, which can be below virtual screen 506. In some embodiments, a back-left channel can be spatialized to speaker position 508d, which can be behind and to the left of user 502. In some embodiments, a back-right channel can be spatialized to speaker position 508e, which can be behind and to the right of user 502.

XR system 504 may use persistent coordinate data to determine speaker positions (e.g., 508a, 508b, 508c, 508d, and/or 508e) in a real environment. For example, speaker positions 508a, 508b, 508c, 508d, and/or 508e may be positioned around a physical couch in user 502's living room. The user 502's position may be determined using a sensor of the XR system 504 (e.g., using a sensor of MR system 112 or 200 to determine information related to the real environment, an IMU, a camera). If user 502 leaves the living room, spatialized audio presented from those speaker positions may appear muffled and/or occluded, which may simulate a behavior of physical speakers positioned in the same physical locations. In some embodiments, speaker positions may not be tied to a real environment. For example, as user 502 moves around a real environment, speaker positions 508a, 508b, 508c, 508d, and/or 508e (and/or virtual screen 506) may dynamically relocate to remain at fixed positions relative to the position of user 502. Although a six channel configuration is described herein and a five channel configuration is shown in FIG. 5, it is contemplated that any suitable speaker arrangement can be used. For example, more or fewer speaker channels can be used. In some embodiments, a speaker arrangement may also indicate more detailed or specific positioning than simply relational positioning relative to a user and/or a screen (e.g., speaker position 508d may be exactly 1 foot behind user 502, 1 foot above user 502, and 1 foot to the left of user 502). For instance, absolute positions may be specified for speaker positions in a speaker arrangement. The speaker arrangement may be determined using a sensor of the XR system 504 (e.g., a sensor of the MR system 112 or 200, an IMU, a camera). For example, using the sensor to determine information related to the real environment, a speaker may be positioned at a location corresponding to a feature of the real environment (e.g., a location on a wall, a location on a ceiling, a location on a pillar). In some embodiments, audio presentation (e.g., using the speakers) may be determined using a sensor of the XR system 504 (e.g., a sensor of the MR system 112 or 200, an IMU, a camera). For example, audio may be presented based on a feature of the real environment (e.g., additional echo or reverberation may be added to the audio based on acoustic of the environment, determined using information from the sensor).

Figure 6:
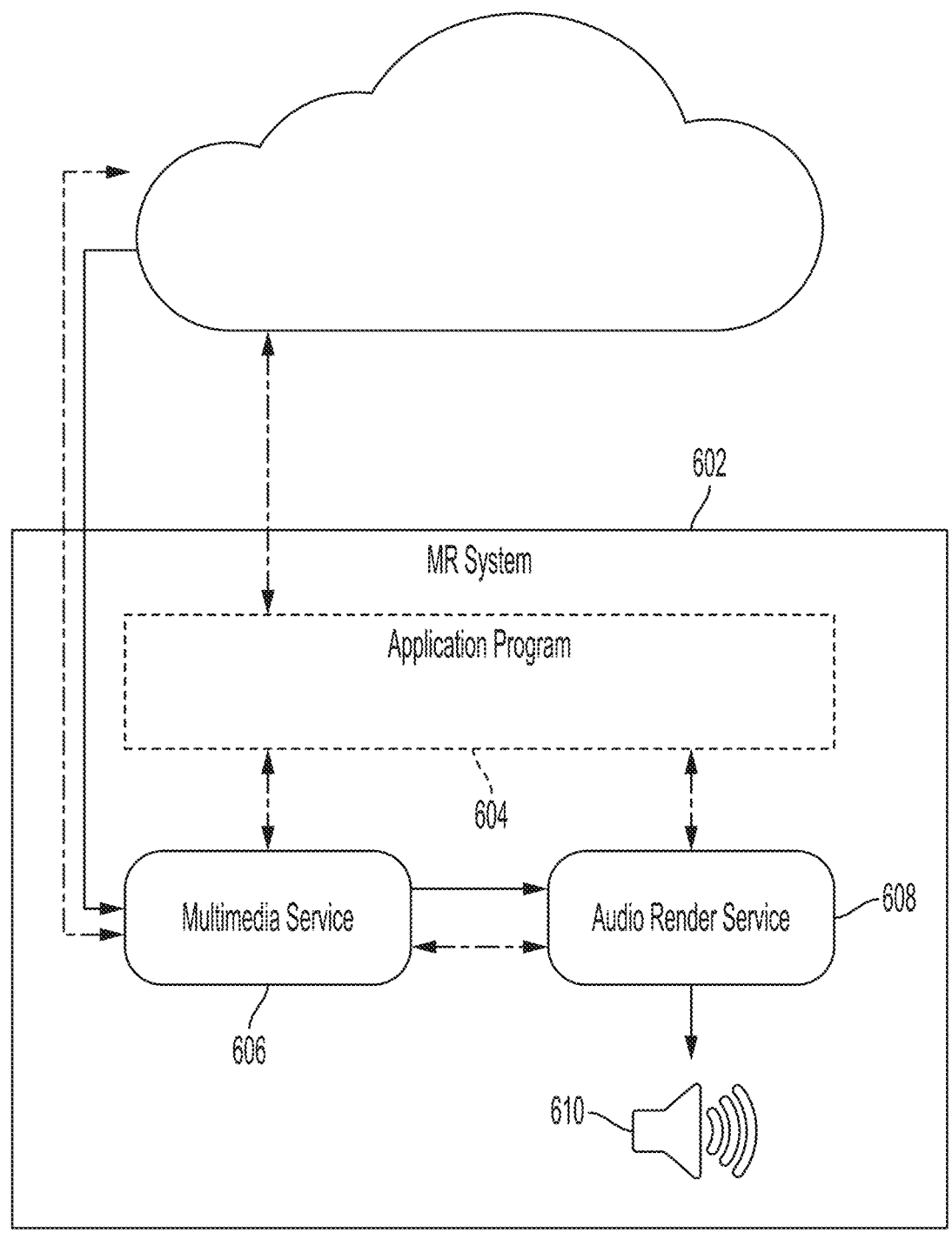
FIG. 6 illustrates an example immersive audio platform, according to some embodiments.

FIG. 6 illustrates an exemplary immersive audio platform, according to some embodiments. In some embodiments, XR system 602 (which can correspond to MR systems 112, 200) can include one or more computer systems configured to execute computer instructions. In some embodiments, XR system 602 can include one or more computer systems configured to store one or more data structures. In some embodiments, XR system 602 can be configured to run application program 604. Application program 604 may be configured and/or developed in one or more application development frameworks (e.g., Unity, Unreal Engine, etc.). In some embodiments, application program 604 may be developed by a third-party (e.g., by an entity that did not develop XR system 602). In some embodiments, the XR system 602 (which can correspond to MR systems 112, 200) includes a sensor (e.g., a sensor of the MR system 112 or 200, an IMU, a camera) for determining how the audio content is being presented to a user. For example, an element of the XR system 602 (e.g., application program 604, multimedia service 606, audio render service 608) may receive information from the sensor (e.g., information about an environment of the XR system 602) and based on the information, the element updates how the audio content is presented.

In some embodiments, application program 604 may be configured to play digital content (e.g., video and/or audio content). For example, application program 604 may be configured as a client of a digital streaming service, which may digitally stream content to end-user devices (e.g., XR system 602). In some embodiments, application program 604 may be configured to communicate with one or more remote servers, which may store digital content to be streamed to end-user devices. Application program 604 may refer to content available for streaming from one or more remote servers, and application program 604 may present this data to an end-user. In some embodiments, application program 604 may transmit a request to stream specified digital content to one or more remote servers, and application program 604 may not receive the digital content (e.g., the digital content can pass directly from one or more remote servers to multimedia service 606). Bypassing application program 604 can have the advantage of maintaining consistency in how media content is presented across platforms or across application programs. Bypassing application program 604 can also be desirable from a security and/or privacy perspective, because application program 604 may not be required to handle the digital content (instead, the system level platform may manage the digital content directly from the source).

In some embodiments, XR system 602 may receive encoded digital content (e.g., as a result of a request by e.g., application program 604 to stream specified digital content). In some embodiments, encoded digital content can be received by multimedia service 606 (represented by a solid line), which may be configured to decode encoded content. For example, multimedia service 606 may utilize one or more codecs, which may be configured to convert encoded data into uncompressed data (e.g., into PCM data). In some embodiments, multimedia service 606 may communicate with application program 604. For example, application program 604 may transmit control data (represented by a dotted line) to multimedia service 606. Control data may include formatting and/or audio handles for each audio channel received at multimedia service 606. In some embodiments, control data can include licensing and/or digital rights management information. In some embodiments, multimedia service 606 may receive control data (represented by a dotted line) including format data, data content, digital rights management, appropriate codec, etc. from one or more remote servers. In some embodiments, multimedia service 606 may transmit format data to application program 604. In some embodiments, multimedia service 606 can be configured as an operating system service, and may be available to one or more application programs running on XR system 602 (e.g., application program 604). In some embodiments, an application running on XR system 602 (e.g., application program 604) may communicate with multimedia service 606 using an application programming interface ("API") and/or a software development kit ("SDK").

In some embodiments, multimedia service 606 may be configured to receive encoded audio content directly from one or more remote servers and generate decoded audio content based on the encoded audio content. For example, multimedia service 606 can include one or more codecs, which may convert an encoded audio stream into a decoded audio stream. In some embodiments, multimedia service 606 can include a variety of different codecs, which may support a variety of different media content. In some embodiments, multimedia service 606 can include support for adaptive bitrate streaming (e.g., MPEG-DASH). In some embodiments, application program 604 may transmit control data (represented by a dotted line) including network information (e.g., a network port) to one or more remote servers, and the one or more remote servers may transmit encoded audio (represented by a solid line) to multimedia service 606 using the provided port. In some embodiments, multimedia service 606 can be configured to receive encoded audio from one or more remote servers. In some embodiments, multimedia service 606 can be configured to receive encoded audio from one or more application programs running on XR system 602 (e.g., application program 604), which may have received encoded audio from one or more remote servers or from any form of digital storage (not depicted in FIG. 6).

Multimedia service 606 and/or audio render service 608 can include one or more computer systems configured to execute instructions and/or store one or more data structures. In some embodiments, multimedia service 606 and/or audio render service 608 can be configured to execute a process, sub-process, thread, and/or service, which may run on one or more computer systems. In some embodiments, multimedia service 606 and/or audio render service 608 can include a process, which may run in a run-time environment. In some embodiments, multimedia service 606 and/or audio render service 608 can include a sub-process of a parent process. Instructions executed by multimedia service 606 and/or audio render service 608 can include one or more components. In some embodiments, instructions executed by multimedia service 606 and/or audio render service 608 can run in a general-purpose processor, and in some embodiments, instructions executed by multimedia service 606 and/or audio render service 608 may run in an audio-specific processor (e.g., a DSP). In some embodiments, instructions executed by multimedia service 606 and/or audio render service 608 may run in a different process address space and/or memory space than other components and/or services. In some embodiments, instructions executed by multimedia service 606 and/or audio render service 608 may run as one or more threads. In some embodiments, instructions executed by multimedia service 606 and/or audio render service 608 may share a process address and/or memory space with other components and/or services.

In some embodiments, audio render service 608 can be configured to receive decoded audio (represented by a solid line) and spatialize and/or render the decoded audio. For example, multimedia service 606 can be configured to transmit decoded audio to audio render service 608. In some embodiments, audio render service 608 can receive decoded audio from multimedia service 606. For example, multimedia service 606 may decode the received audio data, and the decoded audio data is sent to audio render service 608. In some embodiments, audio render service 608 can communicate with application program 604. For example, application program 604 may transmit control data (represented by a dotted line) to audio render service 608. Control data can include one or more handles corresponding to one or more audio channels, and application program 604 may pass the one or more handles to audio render service 608. Audio render service 608 may then spatialize the received decoded audio. In some embodiments, audio render service 608 can spatialize decoded audio according to data that may be included with the audio stream (e.g., audio stream metadata may indicate what channel arrangement should be used for spatialization). In some embodiments, audio render service 608 may be configured to spatialize data according to an audio scene. For example, application program 604 may transmit audio scene data to audio render service 608. In some embodiments, audio scene data can include data on where sound sources should be placed in relation to a user, a real/virtual environment, and/or objects within a real/virtual environment. In some embodiments, audio render service 608 can be configured as an operating system service, and may be available to one or more application programs running on XR system 602 (e.g., application program 604). In some embodiments, an application running on XR system 602 (e.g., application program 604) may communicate with audio render service 608 using an application programming interface ("API") and/or a software development kit ("SDK"). In some embodiments, audio render service 608 can be configured to receive uncompressed audio from XR system 602 and/or one or more application programs running on XR system 602 (e.g., application program 604). For example, audio content may be generated on XR system 602 and/or one or more application programs running on XR system 602 in an uncompressed format, and the uncompressed audio may be directly passed to audio render service 608 without requiring an encoding/decoding process (e.g., because the audio does not need to be transmitted from remote locations). In some embodiments, audio render service 608 can spatialize and/or render audio content, which may be presented to a user via one or more speakers of XR system 602. For example, audio render service 608 can transmit spatialized audio to speaker 610. Speaker 610 can be configured to receive one or more audio signals and output audio to a user of XR system 602.

Spatializing sound (e.g., configuring a sound source so that it can be perceived as radiating from a certain location) can be done using any suitable method. For example, a head-related transfer function ("HRTF") can be used to simulate a sound originating from a particular location. In some embodiments, a generic HRTF can be used. In some embodiments, one or more microphones around a user's ear (e.g., one or more microphones of a XR system) can be used to determine one or more user-specific HRTFs. In some embodiments, a distance between a user and a virtual sound source may be simulated using suitable methods (e.g., loudness attenuation, high frequency attenuation, a mix of direct and reverberant sounds, motion parallax, etc.). Other examples of sound spatialization are described below.

In some embodiments, speaker arrangement affects how sound is spatialized (e.g., how a distance between a virtual speaker and a listener is perceived), and the speaker arrangement may be determined using a sensor of the XR system 602 (e.g., a sensor of the MR system 112 or 200, a sensor of XR system 502, an IMU, a camera). For example, using the sensor to determine information related to the real environment, a speaker may be positioned at a location corresponding to a feature of the real environment (e.g., a location on a wall, a location on a ceiling, a location on a pillar). In some embodiments, audio presentation (e.g., using the speakers) may be determined using a sensor of the XR system 602 (e.g., a sensor of the MR system 112 or 200, a sensor of XR system 502, an IMU, a camera). For example, audio may be presented based on a feature of the real environment (e.g., additional echo or reverberation may be added to the audio based on acoustic of the environment, determined using information from the sensor), advantageously further spatializing the audio being presented and providing a listener with a more immersive experience.

It can be beneficial to architect an immersive audio platform such that an application program may leverage/control native OS functionality. For example, allowing application program 604 to have encoded audio sent directly to multimedia service 606 (or to facilitate a transfer from one or more remote servers to multimedia service 606) and to specify an audio scene to audio render service 608, which can then spatialize and/or render the audio for presentation to a user, may be preferable to requiring application program 604 to execute such functions itself. Requiring application program 604 to incorporate various libraries (or other methods) may result in unwanted effort on the part of a developer of application program 604. In some embodiments, it can further be more efficient to centralize functionality (e.g., codecs) at the system level that may be used by multiple application programs. Centralization may be more computationally efficient and/or save power. In some embodiments, building audio platform functions into an operating system of XR system 602 and exposing the functionality to application programs may also enable nimble future development. For example, XR system 602 may add, change, and/or remove functionality associated with multimedia service 606 (e.g., adding additional codec support) and/or audio render service 608, and the updated functionality may be made immediately available to application programs, such as application program 604, configured to run on XR system 602, without requiring any modification of the application programs.

Figure 7:
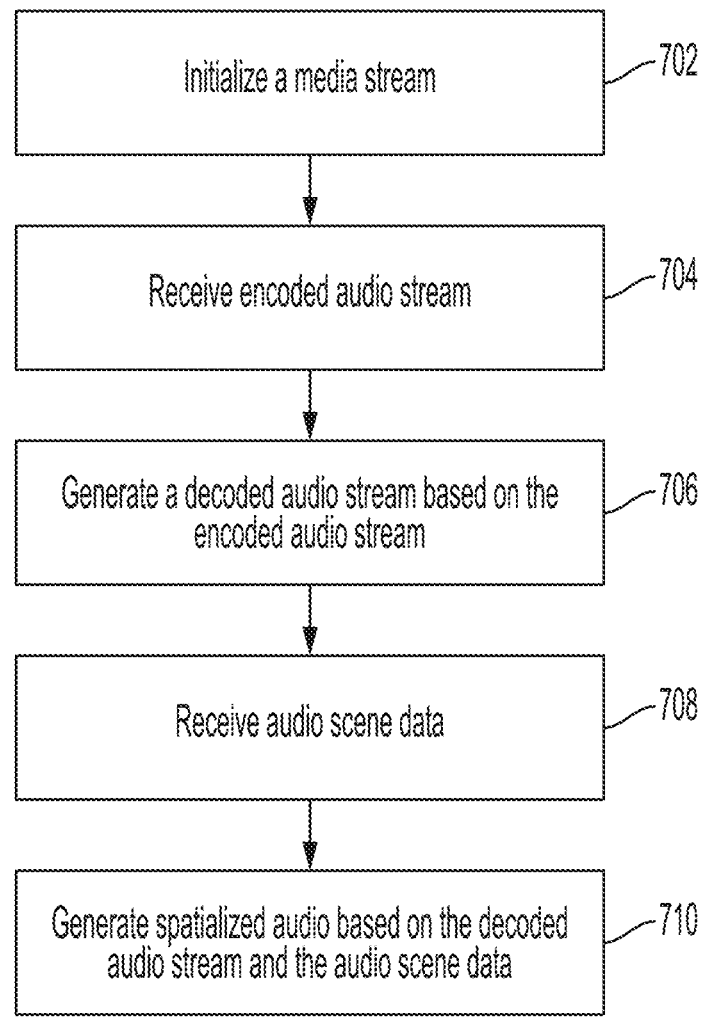
FIG. 7 illustrates an example process for presenting audio content, according to some embodiments.

FIG. 7 illustrates an exemplary process for presenting audio content, according to some embodiments. At step 702, a media stream may be initialized. For example, an application program (e.g., an application program 604 configured to run on a XR system) may communicate with one or more remote servers and request media content. In some embodiments, a media stream may be initialized within an application program (e.g., application program 604), which may locally store media content (either within the application program itself or within the one or more computer systems running the application program).

At step 704, an encoded audio stream can be received. In some embodiments, an encoded audio stream can be received by a XR system (e.g., XR system 602). The encoded audio stream may be received at the direction of one or more application programs configured to run on a XR system (e.g., application program 604). For example, an application program (e.g., application program 604) may transmit network information to one or more remote servers (e.g., a network port), and the application program may indicate to one or more services on a XR system that an encoded audio stream may be incoming. In some embodiments, an encoded audio stream can be received by one or more services configured to run as part of an operating system of a XR system (e.g., multimedia service 606).

At step 706, a decoded audio stream can be generated based on the encoded audio stream. In some embodiments, a decoded audio stream can be generated using one or more codecs, which can be configured to decompress an encoded audio stream. In some embodiments, the decoded audio stream can be generated by one or more services configured to run as part of an operating system of an XR system (e.g., multimedia service 606). In some embodiments, a decoded audio stream can include PCM data. In some embodiments, a decoded audio stream can be received by one or more services configured to run as part of an operating system of a XR system. In some embodiments, a decoded audio stream can be received from one or more services configured to run as part of an operating system of a XR system (e.g., audio render service 608).

At step 708, audio scene data can be received (e.g., by audio render service 608). Audio scene data can include parameters for how sound should be presented. For example, audio scene data can specify how many channels should be presented, where the channels should be located, how the channels should be positioned (e.g., located and/or oriented) relative to a user, a real/virtual environment, and/or objects within a real/virtual environment. In some embodiments, audio scene data can associate audio content with one or more real and/or virtual objects in a MRE. For example, one or more sensors of a XR system may use simultaneous localization and mapping (SLAM) and/or persistent coordinate data to associate an audio channel with a position in three-dimensional space (e.g., an audio channel can be associated with a position in a user's real environment, such as to the left of a user's sofa). In some embodiments, audio scene data can include an association between audio content (e.g., an audio channel) and a real/virtual object. For example, an audio channel may appear to radiate from a real/virtual object, and if the real/virtual object moves, then the audio channel may also appear to move correspondingly. In some embodiments, audio scene data can include parameters, such as parameters for how audio content should interact with real and/or virtual objects. For example, audio scene data can include parameters that may govern whether a virtual sound source should be occluded by real/virtual objects, should reflect off of real/virtual objects, and/or whether a virtual sound source should reverberate off of real/virtual objects. In some embodiments, audio scene data can be received from one or more applications configured to run on a XR system. In some embodiments, audio scene data can be received from one or more remote servers. In some embodiments, audio scene data can accompany an audio stream (e.g., as part of metadata).

In some embodiments, the audio scene data are determined using a sensor (e.g., a sensor of the MR system 112 or 200, a sensor of XR system 502, a sensor of XR system 602, an IMU, a camera). For example, using the sensor to determine information related to the real environment, a speaker or a channel may be positioned at a location corresponding to a feature of the real environment (e.g., a location on a wall, a location on a ceiling, a location on a pillar). In some embodiments, the scene data include data associated with audio presentation (e.g., using the speakers), and the data associated with audio presentation may be determined using a sensor (e.g., a sensor of the MR system 112 or 200, a sensor of XR system 502, a sensor of XR system 602, an IMU, a camera). For example, audio may be presented based on a feature of the real environment (e.g., additional echo or reverberation may be added to the audio based on acoustic of the environment, determined using information from the sensor), advantageously further spatializing the audio being presented and providing a listener with a more immersive experience.

In some embodiments, audio scene data may include parameters that may be adjustable by an application program and/or by a user. For example, a 5.1 channel audio system may include a back-left and a back-right channel. In some embodiments, an application program and/or a user may indicate where and/or how far back a back-left and a back-right channel should be positioned. In some embodiments, the back channels may be placed along one or more predefined vectors, and how far they are positioned along the vector may be adjusted by a scalar multiplier. In some embodiments, an application program and/or a user may adjust other virtual speaker channel (e.g., a front-left, a front-right, and/or a center speaker channel) arrangements as well. In some embodiments, virtual speaker channel arrangements can be customized by context. For example, a user may assign a first speaker channel arrangement for watching movies, a second arrangement for news, a second arrangement for sports, etc. In some embodiments, a speaker channel arrangement can be associated with a specific application program.

In some embodiments, a speaker channel arrangement can be associated with a physical environment. For example, a user may assign speaker channels to particular positions in a particular room. As another example, information provided by a sensor may assign speaker channels to particular positions in a particular room, as described herein. When the user enters that room in the future, a XR system may recognize the room (e.g., using image recognition and/or position data; using sensors of the XR system, as described herein) and automatically present audio according to the predetermined speaker channel arrangement and/or other audio scene data. In some embodiments, audio scene data may be transmitted to a remote server and received by a XR system (e.g., a user may export customized audio scene data to other users of XR systems and/or audio scene data may be stored on a remote server by a XR system and later received by the same XR system).

Audio scene data can support a variety of audio channel configurations (e.g., 5.1 channels, 7.1 channels, and 7.1.4 channels). In some embodiments, audio scene data can support at least three audio spatialization scenarios: user spatialized, per-screen spatialized, and per-room spatialized. It is understood that these spatialization scenarios need not be mutually exclusive; more than one spatialization scenarios may be defined together. A specific HRTF may be associated with a spatialization setting; updating a spatialization setting may include updating the HRTF associated with a previous spatialization setting. The associated HRTF may be determined using the methods and/or hardware disclosed herein. Developers may have the ability to add audio spatialization to their mixed media spatial experience, and one or more services running on a XR device (e.g., XR system 602) may allow a user to choose which audio spatialization he or she wants for that experience depending on the available options. In some examples, the developer of an application may choose specific audio spatialization settings for the application to optimize the user's experience. Various standard formats, codecs, and/or channel configurations can be supported, including AC3 codec, MPEG-DASH, Dolby Atmos format media, etc.

User spatialized audio can be based on the user's position relative to a screen. For example, if a virtual screen (e.g., virtual screen 506) is towards a user's left, the audio can come from a left side of a XR system (e.g., sound appears to be coming from virtual speaker associated with speaker position 508a). The audio may also be adjusted depending on the user's distance to the screen. For example, the audio may be softer as the user moves away from the screen. User spatialized audio to the screen may be an option across different application programs (e.g., audio spatialization in a browser while watching a video). A user's position relative to a screen may be determined during a sensor of the XR system (e.g., a sensor of the MR system 112 or 200, a sensor of XR system 502, a sensor of XR system 602, an IMU, a camera).

Per-screen spatialized audio can also be supported. For example, a screen corresponding to 5.1 channel audio can have left, center, right, back left, and back right channels, as well as a center bass (similar corresponding channel arrangements can also be available for 7.X.X channel surround sound support). These channels can be customized, and as many or as few of those channels can be used as desired (e.g., a user may define the number of channels; a developer of an application may define the number of channels for the application; the number of channels may be determined by a sensor of the XR device (e.g., sensed information associated with features environment and/or number of features in the environment)). The front speaker channels can be placed relative to a virtual screen (e.g., virtual screen 506). The back speaker channels (e.g., virtual speakers associated with speaker positions 508d and 508e) can either be static or dynamic. For example, if the back channels are static, then they can be a fixed distance (e.g., a multiple of the virtual screen width) back from the screen and can remain in that position. For example, if the back channels are dynamic (e.g., move forward and/or back with the user), they can remain a certain distance relative to the back of the user. In the case of dynamic back speakers, the user may have an option to adjust a multiplier to adjust back channel distance. The user can also be able to define and select custom spatial modes depending on the content the user is watching. For instance, a user could have different speaker configurations and/or spatial modes for movies, news, and sports. For example, the user may set (e.g., using a graphical interface of the XR system) back speaker channels to be static for movies and news and dynamic for sports.

Per-room spatialized audio can also be supported. For example, a user can define virtual speaker channels (e.g., for 5.X.X channels, 7.X.X. channels) for a particular room. A graphical user interface of a XR system may be configured to receive input from the user to set up the virtual speaker channels. Once the user sets up configuration of the virtual speakers for a given room, the configuration can be saved and automatically loaded if a room is recognized as a known room (e.g., via position data and/or image recognition). This way, users can have a first surround sound/audio spatialization configuration in the living room and a second configuration in the kitchen for their preferred sound. In some examples, sensors (e.g., cameras, GPS, acoustic sensors, LIDAR) of a wearable head device, such as described herein, can be used to identify a room and trigger loading of a configuration specific to that room. Each room spatialization may include a corresponding per-screen spatialization.

For example, the user can define and/or select custom spatial modes depending on the content the user is watching. For instance, a user could have different speaker configurations for movies, news, and sports. For example, the user may set (e.g., using a graphical interface of the XR system) back speaker channels to be static for sports in the kitchen and dynamic for sports in the living room.

At step 710, spatialized audio can be generated based on the decoded audio stream and the audio scene data (e.g., using audio render service 608). For example, the decoded audio stream may include six channels, and the audio scene data may specify how the six channels should be arranged with respect to a virtual screen. In some embodiments, the decoded audio may be spatialized such that each channel appears to originate from a point in space around a virtual screen. In some embodiments, the spatialized audio can be rendered and presented to a user of a XR system.

According to some embodiments, a method comprises: receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of a wearable head device; receiving, via the second service, a third input from the application program, wherein the third input corresponds to a position of one or more virtual speakers; generating, via the second service, a spatialized audio stream based on the decoded audio stream, the second input, and the third input; and presenting, via one or more speakers of the wearable head device, the spatialized audio stream.

According to some embodiments, the second input corresponds to a position of the wearable head device.

According to some embodiments, the position of the one or more virtual speakers is based on the position of the wearable head device.

According to some embodiments, the second input corresponds to a position of a physical object in a real environment.

According to some embodiments, the position of the one or more virtual speakers is based on the position of the physical object.

According to some embodiments, the encoded audio stream is received from a remote server.

According to some embodiments, the first service is a different service than the second service.

According to some embodiments, the spatialized audio stream comprises six audio channels, wherein one of the six audio channels comprises a subwoofer channel.

According to some embodiments, the spatialized audio stream comprises eight audio channels, wherein one of the eight audio channels comprises a subwoofer channel.

According to some embodiments, presenting the spatialized audio stream is based on a position and distance of the wearable head device relative to a virtual screen configured to present a virtual content displayed on a display of the wearable head device.

According to some embodiments, the spatialized audio stream is presented based on at least one of user spatialized audio, per-screen spatialized audio, and per-room spatialized audio.

According to some embodiments, the spatialized audio stream is presented based on the per-screen spatialized audio, the spatialized audio stream is associated with one of a static mode and a dynamic mode, and the wearable head device is in a first position. The method further comprises: moving the wearable head device from the first position to a second position, different from the first position; in accordance with a determination that the spatialized audio stream is associated with the static mode, presenting the first spatialized audio based on a first distance from the first position to at least one of the position of one or more virtual speakers; and in accordance with a determination that the spatialized audio stream is associated with the dynamic mode, presenting a second spatialized audio based on a second distance from the second position to at least one of the position of one or more virtual speakers.

According to some embodiments, the spatialized audio stream is presented based on the per-room spatialized audio. The method further comprises: in accordance with a determination that a position of the wearable head device is in a first room, presenting the spatialized audio comprises presenting a first spatialized audio associated with the first room; and in accordance with a determination that a position of the wearable head device is in a second room, presenting the spatialized audio comprises presenting a second spatialized audio associated with the second room. The first spatialized audio is different than the second spatialized audio, and the first room is different than the second room.

According to some embodiments, the presentation of the spatialized audio stream is based on user settings.

According to some embodiments, the presentation of the spatialized audio stream is based on settings of the application program.

According to some embodiments, the first spatialized audio stream is associated with a centralized setting. The method further comprises: receiving a fourth input from a second application program; and presenting, via the one or more speakers of the wearable head device, a second spatialized audio stream associated with the centralized setting.

According to some embodiments, a system comprises: a wearable head device comprising one or more sensors and one or more speakers; and one or more processors configured to execute a method comprising: receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of the wearable head device; receiving, via the second service, a third input from the application program, wherein the third input corresponds to a position of one or more virtual speakers; generating, via the second service, a spatialized audio stream based on the decoded audio stream, the second input, and the third input; and presenting, via the one or more speakers of the wearable head device, the spatialized audio stream.

According to some embodiments, the second input corresponds to a position of the wearable head device.

According to some embodiments, the position of the one or more virtual speakers is based on the position of the wearable head device.

According to some embodiments, the second input corresponds to a position of a physical object in a real environment.

According to some embodiments, the position of the one or more virtual speakers is based on the position of the physical object.

According to some embodiments, the encoded audio stream is received from a remote server.

According to some embodiments, the first service is a different service than the second service.

According to some embodiments, the spatialized audio stream comprises six audio channels, wherein one of the six audio channels comprises a subwoofer channel.

According to some embodiments, the spatialized audio stream comprises eight audio channels, wherein one of the eight audio channels comprises a subwoofer channel.

According to some embodiments, presenting the spatialized audio stream is based on a position and distance of the wearable head device relative to a virtual screen configured to present a virtual content displayed on a display of the wearable head device.

According to some embodiments, the spatialized audio stream is presented based on at least one of user spatialized audio, per-screen spatialized audio, and per-room spatialized audio.

According to some embodiments, the spatialized audio stream is presented based on the per-screen spatialized audio, the spatialized audio stream is associated with one of a static mode and a dynamic mode, the wearable head device is in a first position, and the method further comprises: moving the wearable head device from the first position to a second position, different from the first position; in accordance with a determination that the spatialized audio stream is associated with the static mode, presenting the first spatialized audio based on a first distance from the first position to at least one of the position of one or more virtual speakers; and in accordance with a determination that the spatialized audio stream is associated with the dynamic mode, presenting a second spatialized audio based on a second distance from the second position to at least one of the position of one or more virtual speakers.

According to some embodiments, the spatialized audio stream is presented based on the per-room spatialized audio, and the method further comprises: in accordance with a determination that a position of the wearable head device is in a first room, presenting the spatialized audio comprises presenting a first spatialized audio associated with the first room; and in accordance with a determination that a position of the wearable head device is in a second room, presenting the spatialized audio comprises presenting a second spatialized audio associated with the second room. The first spatialized audio is different than the second spatialized audio, and the first room is different than the second room.

According to some embodiments, the presentation of the spatialized audio stream is based on user settings.

According to some embodiments, the presentation of the spatialized audio stream is based on settings of the application program.

According to some embodiments, the first spatialized audio stream is associated with a centralized setting, and the method further comprises: receiving a fourth input from a second application program; and presenting, via the one or more speakers of the wearable head device, a second spatialized audio stream associated with the centralized setting.

According to some embodiments, a non-transitory computer-readable medium storing instructions, when executed by one or more processors, cause the one or more processors to execute a method comprising: receiving a first input from an application program; in response to receiving the first input, receiving, via a first service, an encoded audio stream; generating, via the first service, a decoded audio stream based on the encoded audio stream; receiving, via a second service, the decoded audio stream; receiving a second input from one or more sensors of a wearable head device; receiving, via the second service, a third input from the application program, wherein the third input corresponds to a position of one or more virtual speakers; generating, via the second service, a spatialized audio stream based on the decoded audio stream, the second input, and the third input; and presenting, via one or more speakers of the wearable head device, the spatialized audio stream.

According to some embodiments, the second input corresponds to a position of the wearable head device.

According to some embodiments, the position of the one or more virtual speakers is based on the position of the wearable head device.

According to some embodiments, the second input corresponds to a position of a physical object in a real environment.

According to some embodiments, the position of the one or more virtual speakers is based on the position of the physical object.

According to some embodiments, the encoded audio stream is received from a remote server.

According to some embodiments, the first service is a different service than the second service.

According to some embodiments, the spatialized audio stream comprises six audio channels, wherein one of the six audio channels comprises a subwoofer channel.

According to some embodiments, the spatialized audio stream comprises eight audio channels, wherein one of the eight audio channels comprises a subwoofer channel.

According to some embodiments, presenting the spatialized audio stream is based on a position and distance of the wearable head device relative to a virtual screen configured to present a virtual content displayed on a display of the wearable head device.

According to some embodiments, the spatialized audio stream is presented based on at least one of user spatialized audio, per-screen spatialized audio, and per-room spatialized audio.

According to some embodiments, the spatialized audio stream is presented based on the per-screen spatialized audio, the spatialized audio stream is associated with one of a static mode and a dynamic mode, the wearable head device is in a first position, and the method further comprises: moving the wearable head device from the first position to a second position, different from the first position; in accordance with a determination that the spatialized audio stream is associated with the static mode, presenting the first spatialized audio based on a first distance from the first position to at least one of the position of one or more virtual speakers; and in accordance with a determination that the spatialized audio stream is associated with the dynamic mode, presenting a second spatialized audio based on a second distance from the second position to at least one of the position of one or more virtual speakers.

According to some embodiments, the spatialized audio stream is presented based on the per-room spatialized audio, and the method further comprises: in accordance with a determination that a position of the wearable head device is in a first room, presenting the spatialized audio comprises presenting a first spatialized audio associated with the first room; and in accordance with a determination that a position of the wearable head device is in a second room, presenting the spatialized audio comprises presenting a second spatialized audio associated with the second room. The first spatialized audio is different than the second spatialized audio, and the first room is different than the second room.

According to some embodiments, the presentation of the spatialized audio stream is based on user settings.

According to some embodiments, the presentation of the spatialized audio stream is based on settings of the application program.

According to some embodiments, the first spatialized audio stream is associated with a centralized setting, and the method further comprises: receiving a fourth input from a second application program; and presenting, via the one or more speakers of the wearable head device, a second spatialized audio stream associated with the centralized setting.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
a wearable head device comprising one or more sensors and one or more speakers; and
one or more processors configured to perform a method comprising:
receiving a spatialized audio signal, wherein the spatialized audio signal is generated based on a position of a virtual speaker and is associated with one of a static mode and dynamic mode; and
in accordance with a determination that the spatialized audio signal is associated with a per-screen spatialized audio and in response to a movement of the wearable head device from a first position to a second position:
in accordance with a determination that the spatialized audio signal is associated with the static mode, presenting the spatialized audio signal via the one or more speakers of the wearable head device based on a distance from the first position to the position of the virtual speaker, wherein the determination that the spatialized audio signal is associated with the static mode comprises determining that the spatialized audio signal is associated with first content; and
in accordance with a determination that the spatialized audio signal is associated with the dynamic mode, presenting the spatialized audio signal via the one or more speakers of the wearable head device based on a distance from the second position to the position of the virtual speaker, wherein the determination that the spatialized audio signal is associated with the dynamic mode comprises determining that the spatialized audio signal is associated with second content, different from the first content.

2. The system of claim 1, wherein:
the method further comprises receiving, from the one or more sensors, an input representing the first position, and
the input indicates the movement of the wearable head device from the first position to the second position.

3. The system of claim 1, wherein:
the method further comprises receiving, from the one or more sensors, an input representing the second position, and
the input indicates the movement of the wearable head device from the first position to the second position.

4. The system of claim 1, wherein:
the method further comprises receiving an input associated with a position of the wearable head device, and
the input indicates a position of the virtual speaker.

5. The system of claim 1, wherein the one or more sensors comprises any of an inertial measurement unit, a camera, a microphone, an electromagnetic receiver, or any combination thereof.

6. The system of claim 1, wherein:
the method further comprises receiving an input associated with a position of a physical object in an environment of the wearable head device, and
the input indicates a position of the virtual speaker.

7. The system of claim 1, wherein the position of the virtual speaker is determined based on a position of a physical object in an environment of the wearable head device.

8. The system of claim 1, wherein the method further comprises receiving an audio stream, and wherein the spatialized audio signal is generated based on the audio stream.

9. The system of claim 1, wherein:
the spatialized audio signal comprises one or more audio channels, and
the one or more audio channels comprises a subwoofer channel.

10. The system of claim 1, wherein:
the wearable head device further comprises a display, and
the position of the virtual speaker is determined based on content presented via the display.

11. The system of claim 10, wherein the content comprises a virtual screen.

12. A method comprising:
receiving a spatialized audio signal, wherein the spatialized audio signal is generated based on a position of a virtual speaker and is associated with one of a static mode and dynamic mode; and
in accordance with a determination that the spatialized audio signal is associated with a per-screen spatialized audio and in response to a movement of a wearable head device from a first position to a second position:
in accordance with a determination that the spatialized audio signal is associated with the static mode, presenting the spatialized audio signal via one or more speakers of the wearable head device based on a distance from the first position to the position of the virtual speaker, wherein the determination that the spatialized audio signal is associated with the static mode comprises determining that the spatialized audio signal is associated with first content; and
in accordance with a determination that the spatialized audio signal is associated with the dynamic mode, presenting the spatialized audio signal via the one or more speakers of the wearable head device based on a distance from the second position to the position of the virtual speaker, wherein the determination that the spatialized audio signal is associated with the dynamic mode comprises determining that the spatialized audio signal is associated with second content, different from the first content.

13. The method of claim 12, further comprising receiving, from one or more sensors of the wearable head device, an input representing the first position, wherein the input indicates the movement of the wearable head device from the first position to the second position.

14. The method of claim 12, further comprising receiving, from one or more sensors of the wearable head device, an input representing the second position, wherein the input indicates the movement of the wearable head device from the first position to the second position.

15. The method of claim 12, further comprising receiving an input associated with a position of the wearable head device, wherein the input indicates a position of the virtual speaker.

16. The method of claim 12, wherein the wearable head device further comprises one or more sensors comprising any of an inertial measurement unit, a camera, a microphone, an electromagnetic receiver, or any combination thereof.

17. The method of claim 12, wherein the position of the virtual speaker is determined based on a position of a physical object in an environment of the wearable head device.

18. The method of claim 12, further comprising receiving an audio stream, wherein the spatialized audio signal is generated based on the audio stream.

19. The method of claim 12, further comprising presenting content via a display of the wearable head device, wherein the position of the virtual speaker is determined based on the content.

20. A non-transitory computer-readable medium storing instructions which, when executed by one or more processors, cause the one or more processors to perform a method comprising:
receiving a spatialized audio signal, wherein the spatialized audio signal is generated based on a position of a virtual speaker and is associated with one of a static mode and dynamic mode; and
in accordance with a determination that the spatialized audio signal is associated with a per-screen spatialized audio and in response to a movement of a wearable head device from a first position to a second position:
in accordance with a determination that the spatialized audio signal is associated with the static mode, presenting the spatialized audio signal via one or more speakers of the wearable head device based on a distance from the first position to the position of the virtual speaker, wherein the determination that the spatialized audio signal is associated with the static mode comprises determining that the spatialized audio signal is associated with first content; and
in accordance with a determination that the spatialized audio signal is associated with the dynamic mode, presenting the spatialized audio signal via the one or more speakers of the wearable head device based on a distance from the second position to the position of the virtual speaker, wherein the determination that the spatialized audio signal is associated with the dynamic mode comprises determining that the spatialized audio signal is associated with second content, different from the first content.

* * * * *